UNITED STATES PATENT OFFICE.

EDMOND M. MERRELL AND ARCHIBALD MERRELL, OF SODA SPRINGS, IDAHO.

SOLDERING COMPOUND.

No. 899,673.　　　　Specification of Letters Patent.　　Patented Sept. 29, 1908.

Application filed June 8, 1908. Serial No. 437,325.

*To all whom it may concern:*

Be it known that we, EDMOND M. MERRELL and ARCHIBALD MERRELL, citizens of the United States, residing at Soda Springs, in the county of Bannock and State of Idaho, have invented certain new and useful Improvements in Soldering Compounds, of which the following is a specification.

This invention relates to improvements in soldering compounds.

The object of the invention is to provide a soldering compound or flux which will be of wide application to various metals for soldering purposes such as iron, zinc, copper, brass, tin and nickel, and other known metals, and compositions thereof.

Further, the invention aims to provide a compound or flux which will avoid the necessity of removing grease or other fatty collections of matter from the object to be soldered.

According to the invention as now practiced we employ the following ingredients measured by weight in the proportions below indicated:—

| Ingredients. | Parts. |
| --- | --- |
| Sal ammoniac | 11 |
| Powdered rosin | 3 |
| Powdered borax | 1 |
| Bi-carbonate of soda | ½ |
| Blue vitriol | ½ |

In preparing the compound the powdered substances are thoroughly pulverized prior to being mixed with the other ingredients named.

In use one part of the compound is mixed in three parts of water, after which it may be applied to the article to be soldered with a brush, cloth, or other instrument, after which the solder in its melted or semi-fluid state is applied, as is well known to those versed in the art.

In actual use and practice, we have found that the compound is possessed of many advantages, first it is non-poisonous, second it will not injure or corrode any metal on which it may be used and is applied to, third, it may be used on more known metals and compositions thereof than is possible with usual fluxes, and finally it will tin a soldering iron in an inappreciable period of time, thirty seconds having been ascertained by experiment as the actual time required.

The use of blue vitriol has been found to accentuate the properties of the compound and increase the efficiency in the respects herein noted.

Having thus described our invention, what we claim is:

1. A soldering compound composed of sal ammoniac, powdered rosin, powdered borax, bi-carbonate of soda and blue vitriol.

2. A soldering compound composed of eleven parts of sal ammoniac, three parts of powdered rosin, one part of powdered borax, one-half part of bi-carbonate of soda, and one-half part of blue vitriol.

3. A soldering compound composed of sal ammoniac, powdered rosin, powdered borax, bi-carbonate of soda and blue vitriol thoroughly mixed, and mixed in the proportion of one part of said compound in three parts of water.

In testimony whereof we affix our signatures, in presence of two witnesses.

EDMOND M. MERRELL.
　　　　ARCHIBALD MERRELL.

Witnesses:
　CHARLES F. POTTER,
　W. E. CLIFFORD.